US007006996B2

(12) United States Patent
Hasegawa

(10) Patent No.: US 7,006,996 B2
(45) Date of Patent: Feb. 28, 2006

(54) RESTRICTION CANCELING APPARATUS

(75) Inventor: Yutaka Hasegawa, Shizuoka-Ken (JP)

(73) Assignee: Yamaha Corporation, Shizuoka-ken (JP)

( * ) Notice: Subject to any disclaimer, the term of this patent is extended or adjusted under 35 U.S.C. 154(b) by 253 days.

(21) Appl. No.: 09/873,847

(22) Filed: Jun. 4, 2001

(65) Prior Publication Data

US 2001/0054027 A1    Dec. 20, 2001

(30) Foreign Application Priority Data

Jun. 19, 2000 (JP) ............................. 2000-182471

(51) Int. Cl.
    *G06F 17/60* (2006.01)
(52) U.S. Cl. ..................................... 705/52
(58) Field of Classification Search ............ 705/50–55, 705/26–27, 57–59, 64–67, 75–79; 707/104, 707/9; 713/156–162; 380/200–203, 230–233; 725/25–31, 140
    See application file for complete search history.

(56) References Cited

U.S. PATENT DOCUMENTS

| 5,675,734 | A   |   | 10/1997 | Hair ....................... 395/200.01 |
| 6,157,377 | A   | * | 12/2000 | Shah-Nazaroff et al. .... 345/327 |
| 6,195,646 | B1  | * | 2/2001  | Grosh et al. .................. 705/26 |
| 6,314,409 | B1  | * | 11/2001 | Schneck et al. .............. 705/54 |
| 6,865,552 | B1  | * | 3/2005  | Inoue et al. .................. 705/57 |
| 2002/0128936 | A1 | * | 9/2002 | Sako et al. |

FOREIGN PATENT DOCUMENTS

| JP | 11-102391 | 4/1999 |
| JP | 11-250145 | 9/1999 |
| JP | 2000270309 A | * 9/2000 |

OTHER PUBLICATIONS

Desmarais, Norman, "CD-I vs. DVI. (compact disk-interactive; digital video interactive)", Mar. 1989, CD-ROM Librarian, v4, n3, p24 (5), ISSN: 0893-9934.*
Notification of Reasons for Refusal for Patent Application No. 2000-182471, dated Apr. 27, 2004, received from client Aug. 9, 2004.

* cited by examiner

Primary Examiner—Mary D. Cheung
(74) Attorney, Agent, or Firm—Harness, Dickey & Pierce, P.L.C.

(57) ABSTRACT

A restriction canceling apparatus comprising: a memory that stores content consisting of a plurality of relating parts whose functions are restricted and a plurality of restriction canceling data, each corresponding to one of said parts; a first receiver that receives a first request of a client for transmission of the content; a first transmitter that transmits said content to said client upon said first request; a second receiver that receives a second request of said client for transmission of at least one of the restriction canceling data; and a second transmitter that transmits the restriction canceling data to said client upon said second request.

4 Claims, 5 Drawing Sheets

GRADE 1

GRADE 2

GRADE 3

RESTRICTION CANCELING APPARATUS

This application is based on Japanese Patent Application 2000-182471, filed on Jun. 19, 2000, the entire contents of which are incorporated herein by reference.

BACKGROUND OF THE INVENTION a) Field of the Invention

The present invention relates to a restriction canceling apparatus suitable for distribution of contents such as application programs, image files and MIDI files.

b) Description of the Related Art

Various contents such as application programs, image files, video files and MIDI files are sold via the Internet. A server used by a content provider stores content files, and a client can download a desired content file. If a content provider intends to provide a plurality kind of contents, it is necessary to prepare content files same in number as the number of contents.

With conventional distribution techniques, management by a content provider is cumbersome. For example, contents are required to be arranged by each price or relevant contents are required to be distributed one content at a time.

Some contents are classified into a plurality of grades or have options. In such a case, some clients first buy low price grade contents or basic contents, and some time later, buy upper grade contents or options. However, the client is required to download a large amount of data each time the client buys upper grade contents or options, so that a download work and communication traffics increase.

SUMMARY OF THE INVENTION

An object of the present invention is to provide a restriction canceling apparatus capable of facilitating management of content files.

According to one aspect of the present invention, there is provided a restriction canceling apparatus comprising: a memory that stores content consisting of a plurality of relating parts whose functions are restricted and a plurality of restriction canceling data, each corresponding to one of said parts; a first receiver that receives a first request of a client for transmission of the content; a first transmitter that transmits said content to said client upon said first request; a second receiver that receives a second request of said client for transmission of at least one of the restriction canceling data; and a second transmitter that transmits the restriction canceling data to said client upon said second request.

A plurality of relevant parts with restricted functions are first distributed to a client. In response to a change in usage of the parts by the client, data for removing the part function restriction is distributed to the client. Content management can be made very easy.

Contents consisting of a plurality of parts on which usage restrictions are imposed are downloaded collectively to a client apparatus, and thereafter an encryption key (restriction removing data) is downloaded to the client apparatus in accordance with a usage grade. The usage restriction imposed on the part corresponding to the encryption key will be removed, and that part of the contents can be used. A combination of parts defines the grade, and the grade is a level in a scale of progression from a lower grade to an upper grade in accordance with the encryption key or keys used for removing the restriction or restrictions.

DETAILED DESCRIPTION OF THE PREFERRED EMBODIMENTS

Figure 1:
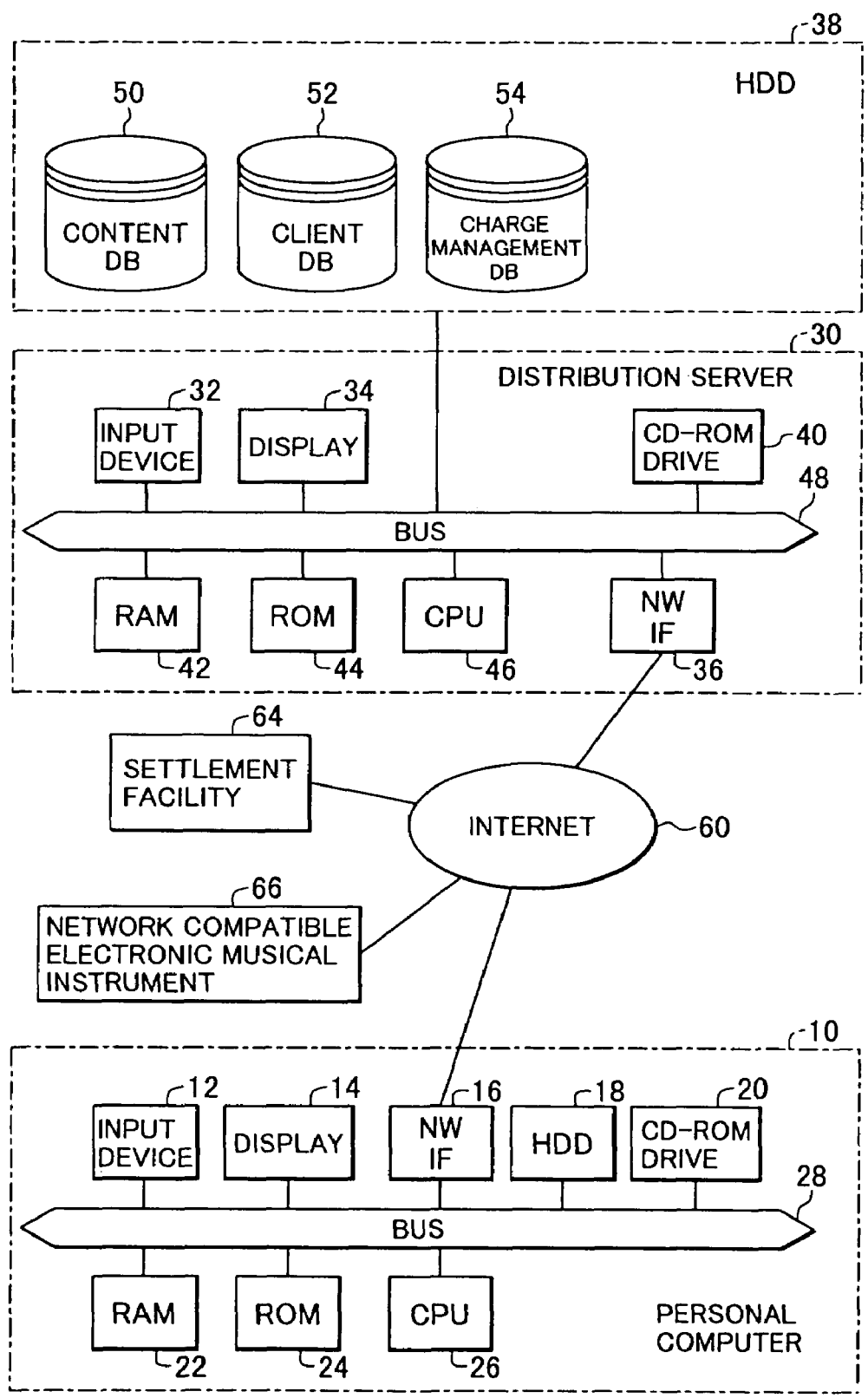
FIG. 1 is a block diagram of a content distribution system according to an embodiment of the invention.

FIG. 1 is a diagram showing the hardware structure of a computer system according to an embodiment of the invention.

A personal computer 10 has an input device 12 such as a keyboard and a mouse and a display 14 for displaying various information to users or clients. A CPU 26 controls each portion of the personal computer 10 via a bus 28 in accordance with a program to be later described. A network interface 16 is used for transferring various data to and from the Internet 60.

A hard disk drive 18 stores application programs including an operating system program and a browser program, in its hard disk. A CD-ROM drive 20 reads the contents of a CD-ROM. A RAM 22 is used for developing a program such as an operating system program and an application program. A ROM 24 stores an initial program loader for CPU 26 and the like.

A content distribution server 30 is connected to the Internet 60. Similar to those constituent elements 12 to 28 in the personal computer 10, the distribution server 30 has an input device 32, a display 34, a network interface 36, a hard disk drive 38, a CD-ROM drive 40, a RAM 42, a ROM 44, a CPU 46 and a bus 48.

A server 64 is used by a settlement facility such as bank and a credit card company to settle a charge of content. An electronic musical instrument 66 compatible with a network can download various contents via the Internet 60, similar to the personal computer 10.

The hard disk drive 38 stores various databases. A content database 50 stores various content files to be provided to clients. A client database 52 stores personal information of each client, user IDs, passwords, encrypted encrypting keys to be distributed to users (details will be given later) and the like.

A charge management database 54 manages charges claimed to clients, and when necessary, notifies the charge amount of each client to the settlement server 64. The hard disk drive 38 stores in its hard disk a Web server program used for accessing a Web page via the Internet 60, a content distribution program to be later described, and the like.

Next, the operation of the embodiment will be described.

Figure 2:
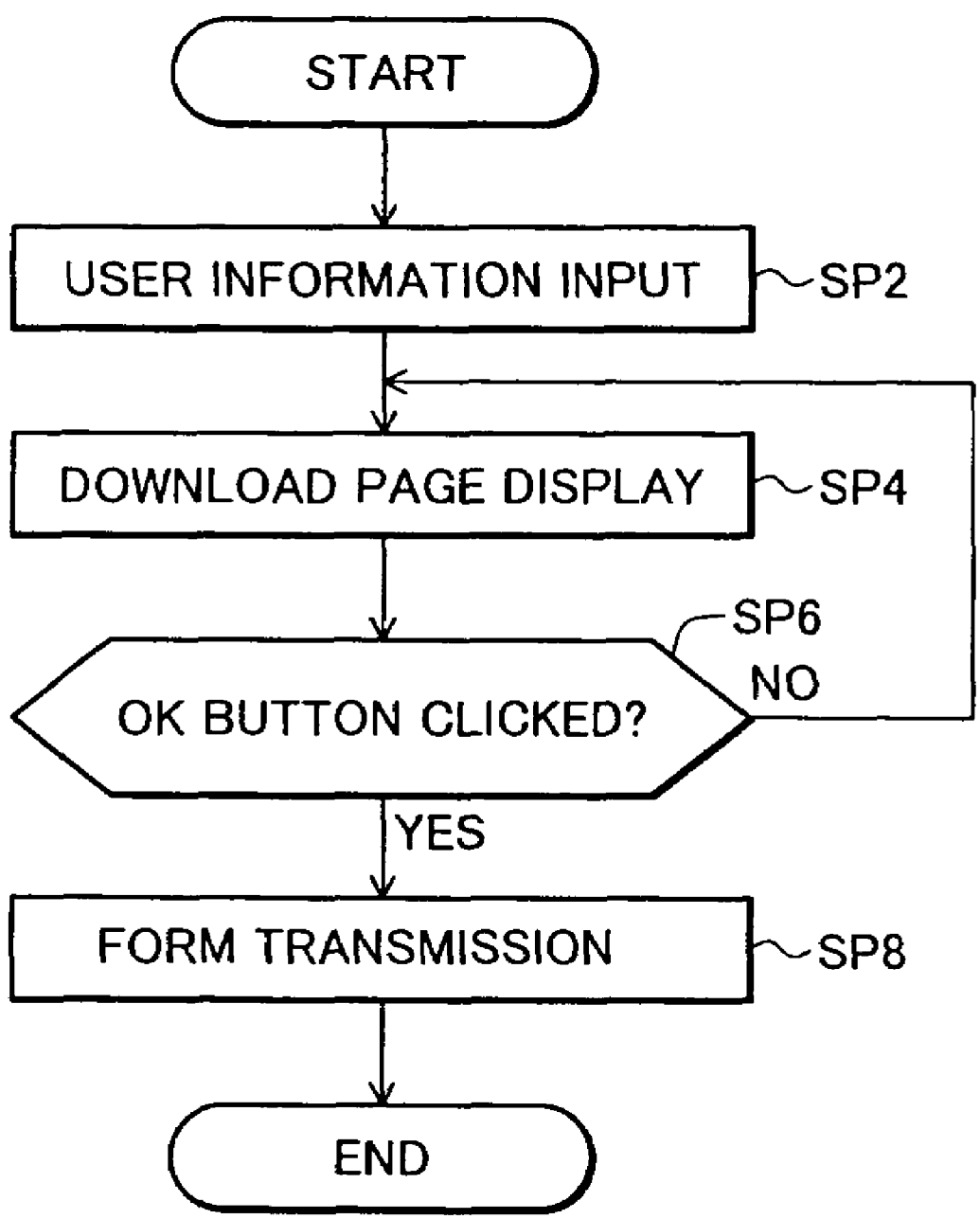
FIG. 2 is a flow chart illustrating a program to be executed by a personal computer.

When the power source of the personal computer 10 on the client side is turned on, the initial program loader stored in ROM 17 is executed to initiate the operating system program. When a predetermined setting is entered in this operating system, a browser is activated and a user information input window that is one of Web pages at the distribution server 30 is displayed on the display 14. Thereafter, the process illustrated in FIG. 2 is performed.

If a user is a new user, personal information is input to the user information input window. The personal information includes the name, address and the like of each user and a public key of the public key ciphering system. The input personal information is transmitted to the distribution server 30 via the Internet 60, and registered in the client database 52. Then, a user ID and a password are supplied to the new user. If a user is a user who has already registered in the client database 52, the user enters the given user ID and password. The entered user ID and password are transmitted to the distribution server 30 to verify them with the contents in the client database 52.

Figure 3:
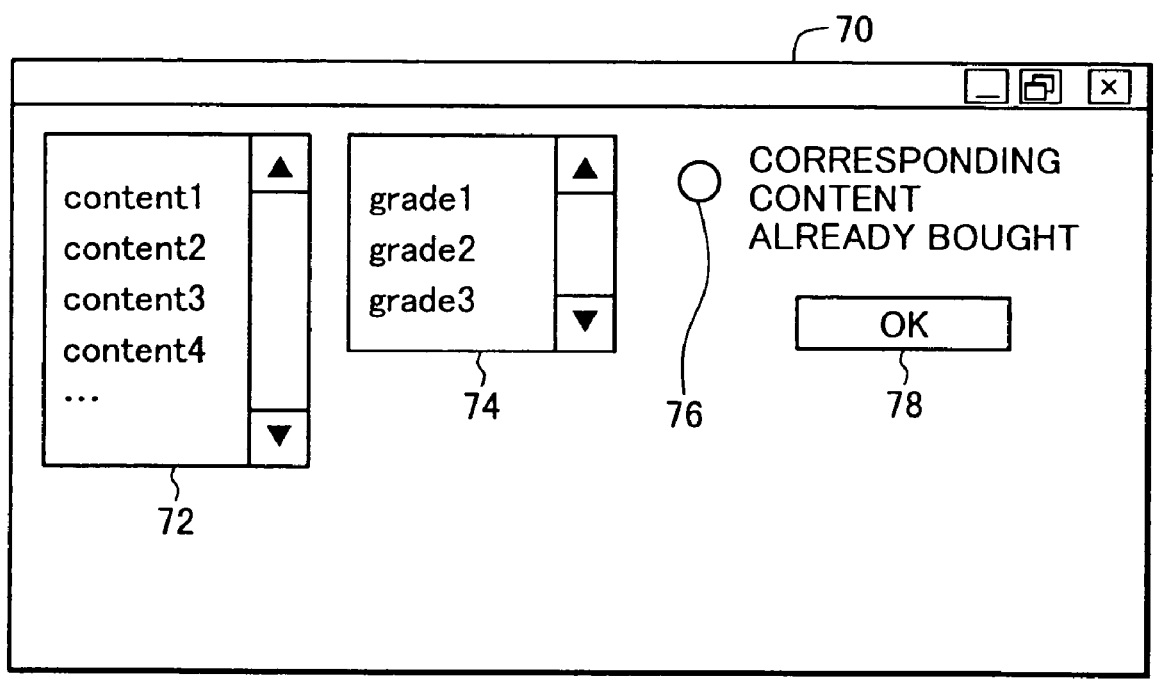
FIG. 3 is a diagram showing a download request page.

After registration or verification in the client database 52 is completed, the process advances to Step SP4. At Step SP4, a download request page 70 shown in FIG. 3 is displayed. In a content select list box 72, a list of contents selectable by a user is displayed. In a grade select list box 74, a list of "grades" selectable in accordance with the selected content is displayed. A check is entered in a check box 76 if the user intending to download content has already had the content of a lower grade. A user instructs to transfer the contents of the download request page 70 to the distribution server 30, by using an OK button 78.

Next, at Step SP6 it is checked whether the OK button 78 is clicked. If it is judged "NO", the flow returns to Step SP4. The download request page 70 continues to be displayed until the OK button 78 is clicked. A user selects a desired content in the content select list box 72 displayed in the window and selects a desired grade displayed in the grade select list box 74.

If the user has already had the content of the low grade, a check is entered in the check box 76. After these user designations, if the user clicks the OK button 78, it is judged "YES" at Step SP6 and the flow advances to Step SP8. At Step SP8, the contents of the download request page 70 are transmitted to the distribution server 30 via the Internet 60. After the above process is completed, the download request page 70 is deleted from the display 14.

An example of setting "grade" will be described. If content is a MIDI file of music, the content is divided, for example, into three parts A, B and C. Part A is a monophonic melody of a highlight portion of the music. Part B is a melody excepting the portion corresponding to Part A or additional sounds (such as harmony sounds in correspondence with the melody of part A). Part C is MIDI data of accompaniment sounds excepting melodies. The highest grade 1 contains all parts A, B and C, the next highest grade 2 contains parts A and B, and the lowest grade 3 contains only part A. The content of the grade 2 or 3 can be used as ringing tone of a telephone with a monophonic or polyphonic specification, and the content of the highest grade 1 can be played as a complete music.

Next, the operation of the server will be described.

First, the description will be given for a user still not having a corresponding content.

Figure 4:
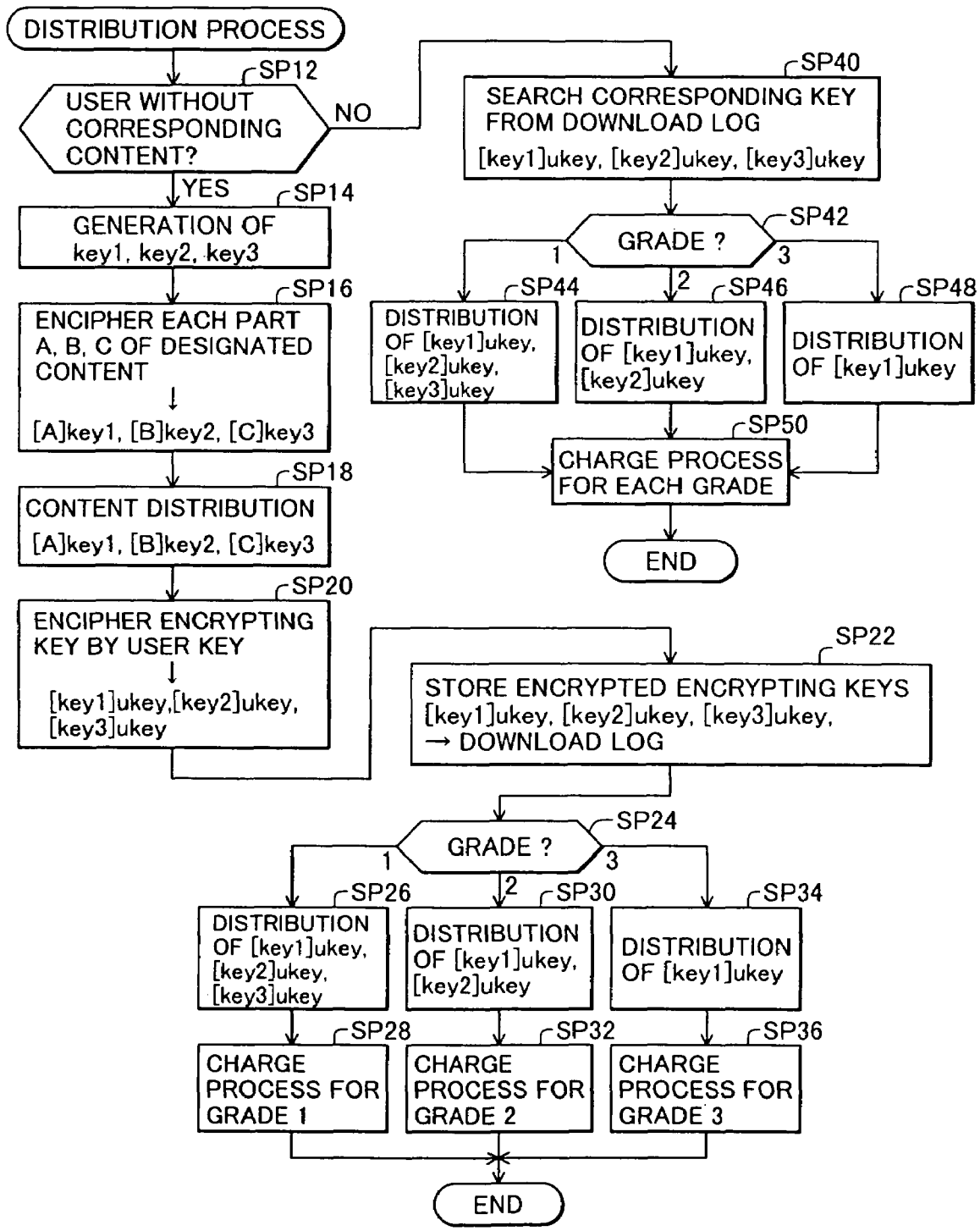
FIG. 4 is a flow chart illustrating a content distribution program to be executed by a distribution server.

Upon reception of the contents of the download request page 70, the distribution server 30 executes a content distribution program whose contents are shown in FIG. 4. At Step SP12 shown in FIG. 4 it is checked whether the download requested client is a user still not having a corresponding content (whether the client has any grade of the requested content). The client not entered a check in the check box 76 is a client still not having a corresponding content.

If it is judged "YES", the flow advances to Step SP14 whereat three encrypting keys key1, key2 and key3 are generated. Next, at Step SP16 parts A, B and C are encrypted by the encrypting keys key1, key2 and key3, respectively. In this specification, data X encrypted by an encrypting key Y is expressed as "[X]Y". At Step SP14, encrypted parts [A]key1, [B]key2 and [C]key3 are generated.

Next, at Step SP18 the encrypted parts [A]key1, [B]key2 and [C]key3 are distributed to the user. Next, at Step SP20 the encrypting keys key1, key2 and key3 are encrypted by a client public key ukey to generate encrypted encrypting keys [key1]ukey, [key2]ukey and [key3]ukey. At Step SP22, these encrypted encrypting keys [key1]ukey, [key2]ukey and [key3]ukey are stored in a download log of the client database 52.

Next, at Step SP24 a process is branched in accordance with the grade selected by the user in the download request page 70. If the grade 1 was selected, the process advances to Step SP26 whereat the encrypted encrypting keys [key1]ukey, [key2]ukey and [key3]ukey are distributed to the client. Next, at Step SP28 the distribution server 30 executes a charge process corresponding to a price of the grade 1 and supplies the charge process result to the settlement facility server 64. The client can thereafter obtain all parts A, B and C by using the encrypting keys key1, key2 and key3 decrypted by a secret key corresponding to the public key.

If the grade 2 was selected on the download request page 70, the process advances to Step SP30 whereat the encrypted encrypting keys [key1]ukey and [key2]ukey are distributed to the client. Next, at Step SP32 the distribution server 30 executes a charge process corresponding to a price of the grade 2 and supplies the charge process result to the settlement facility server 64. The client can thereafter obtain parts A and B by using the encrypting keys key1 and key2 decrypted by the secret key corresponding to the public key.

If the grade 3 was selected on the download request page 70, the process advances to Step SP34 whereat the encrypted encrypting key [key1]ukey is distributed to the client. Next, at Step SP36 the distribution server 30 executes a charge process corresponding to a price of the grade 3 and supplies the charge process result to the settlement facility server 64. The client can thereafter obtain part A by using the encrypting key key1 decrypted by the secret key corresponding to the public key. With the above operations, the process by the distribution server 30 is completed. The client can thereafter configure the content corresponding to the grade by using the distributed part or parts.

Figure 5:
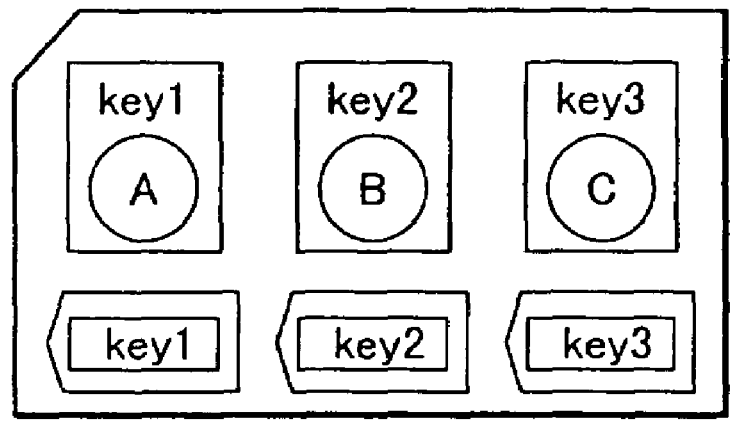
FIG. 5 is a diagram illustrating the operation according to the embodiment.
Figure 5:
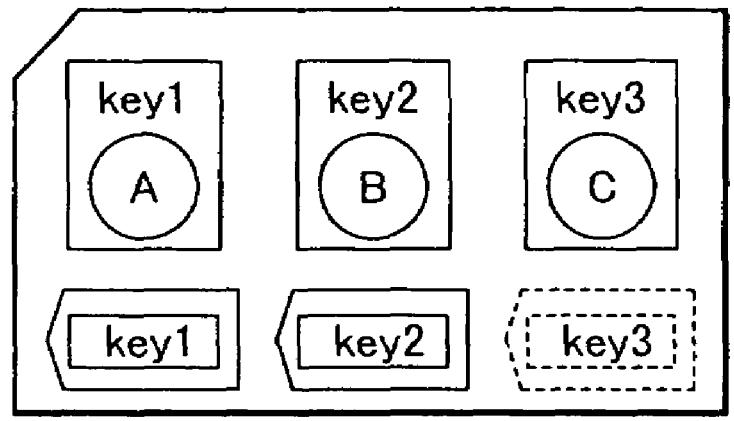
Figure 5:
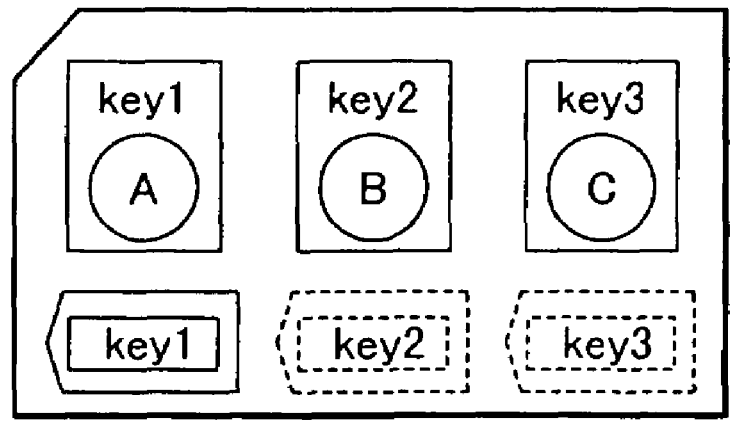

An example of content configuration will be described with reference to FIG. 5. At Step SP18, all of the encrypted parts [A]key1, [B]key2 and [C]key3 are supplied to the client irrespective of any grade selected by the client. However, the client can recover only corresponding one or ones of parts A, B and C by using a supplied one or ones of encrypted encrypting keys [key1]ukey, [key2]ukey and [key3]ukey. By using a recovered part or parts, the content corresponding to the selected grade can be configured.

Next, the description will be given for a user already having a corresponding content.

If the download requested client has already had a corresponding content, it is judged "NO" at Step SP12 and the flow advances to Step SP40. Already having a corresponding content means that Step SP22 was executed and the encrypted encrypting keys [key1]ukey, [key2]ukey and [key3]ukey were stored in the download log of the client database 52, before the current download. Therefore, at Step SP40, the encrypted encrypting keys [key1]ukey, [key2]ukey and [key3]ukey are retrieved from the download log.

Next, at Step SP42 a process is branched in accordance with the grade selected by the client in the download request page 70. Steps SP42, SP44, SP46 and SP48 execute similar operations to those at Steps SP24, SP26, SP30 and SP34. Namely, in accordance with the selected grade, one or ones of the encrypted encrypting keys [key1]ukey, [key2]ukey and [key3]ukey are distributed to the client. Next, at Step SP50 the distribution server 30 executes a charge process corresponding to a price of the selected grade and supplies the charge process result to the settlement facility server 64. Namely, a price of the currently distributed grade subtracted by a price of the already obtained grade is charged to the client.

As described earlier, since the client has already had all the encrypted parts [A]key1, [B]key2 and [C]key3, the client can recover the part or parts by using the supplied encrypted encrypting key or keys. By using the currently recovered part or parts and the already recovered part or parts, the content can be upgraded to a higher level.

The invention is not limited only to the above-described embodiment, but various modifications are possible such as those described in the following.

Although the client apparatus is the personal computer 10 in the embodiment, other apparatus using various contents can also be used, such as the network compatible electronic musical instrument 66, a cellar phone and an amusement apparatus.

In the embodiment, parts A, B and C are encrypted by using the encrypting keys key1, key2 and key3, and the encrypted parts [A]key1, [B]key2 and [C]key3 are generated. Encryption may be of a nest type such as [A, [B, [C]key3]key2]key1. If the data amount of content is small, three files [A]key1, [A, B]key2 and [A, B, C]key3 may be distributed to a user.

In the embodiment, the encrypted parts [A]key1, [B]key2 and [C]key3 are distributed via the Internet 60. Distribution is not limited only to the Internet 60. Since the encrypted parts [A]key1, [B]key2 and [C]key3 cannot be used unless the encrypting keys key1, key2 and key3 are used, the files stored in CD-ROM or the like may be supplied free of charge to many and unspecified persons.

In the embodiment, it is checked at Step SP12, from the contents of the download request page 70 transmitted from the personal computer 10, whether the client is a client already having a corresponding content. This check may be performed independently by the distribution server 30, because the encrypted encrypting key or keys already supplied to each client are being registered in the client database 52.

If a serial number of CPU 26 of the personal computer 10 can be read out, the encrypting keys key1, key2 and key3, using the CPU serial number may generate the public key ukey or the secret key.

In the embodiment, in order to restrict the function of each part A, B, C, encrypting keys are used for encrypting parts A, B and C. Means for restricting the function is not limited only to encryption. For example, a different bit train may replace a portion of each part, and when a request from a client is issued, a correct bit train is distributed.

In the embodiment, "grade" is used as an example of usage of parts, and the "grade" implies a concept of "higher level" and "lower level". The usage is not limited only to the grade. For example, a plurality of application programs such as "word processor, spreadsheet, database and presentation" with a function restriction stored in CD-ROM or the like may be distributed free of charge.

A client selects a desired application program such as "word processor", "database" and "word processor+spreadsheet" and the function restriction is removed upon payment of a charge. In this case, the usage corresponds to a selection state of one or a plurality of application programs.

In the embodiment, although the whole of each part A, B, C is encrypted, only a portion of each part may be encrypted. For example, if content is a MIDI file of music, only a portion of music not encrypted can be listened even if the client does not obtain a encrypting key, and this portion may be used when the client decides to buy it or not.

If the content is a MIDI file of music, the MIDI file having a constant velocity and not encrypted may be distributed to a client. Only when the client buys it, correct velocity data is distributed to correct the velocity. With a constant velocity, the music is monotonous. However, a client can know the feeling of the music more or less. This can be used as an aid in deciding whether the velocity data is bought.

In the embodiment, after a distribution request from a client, the encrypting keys key1, key2 and key3 and the encrypted parts [A]key1, [B]key2 and [C]key3 are generated (Steps SP14 and SP16). A plurality of combinations of the encrypting keys key1, key2 and key3 and the encrypted parts [A]key1, [B]key2 and [C]key3 may be generated beforehand to distribute them immediately after the reception of a distribution request.

Several tens to several hundreds of types of the encrypting keys key1, key2 and key3 and the parts [A]key1, [B]key2 and [C]key3 encrypted by these encrypting keys may be generated beforehand, and randomly selected encrypting keys and encrypted parts are distributed in response to a distribution request from a user still not having a corresponding content.

The present invention has been described in connection with the preferred embodiments. The invention is not limited only to the above embodiments. It is apparent that various modifications, improvements, combinations, and the like can be made by those skilled in the art.

What is claimed is:

1. A restriction removing apparatus comprising:
a memory that stores content consisting of a plurality of related media content parts adapted to be combined to express said content as a plurality of levels of selectable grades and wherein at least some of said parts have an associated restriction that inhibits that associated part from being combined to express said content, and that stores a plurality of restriction removing data, each corresponding to one of said parts and that functions to permit that part to be combined, to thereby select which of said plurality of levels of grades is expressed, and wherein said memory further stores a transmission record of restriction removing data to said client;
a first receiver that receives a first request of a client for transmission of the content;
a first transmitter that transmits said content to said client upon said first request;
a second receiver that receives a second request of said client for transmission of at least one of the restriction removing data;
a second transmitter that transmits the restriction removing data to said client upon said second request; and
a charging device that effects the distribution of the restriction removing data and the charging in accordance with difference of the grades and that charges said client for the content, wherein said charging device charges client first amount of money when none of the restriction removing data has already been transmitted to said client and second amount of money which is lower than said first amount when at least one of the restriction removing data has already been transmitted to said client.

2. A restriction removing system comprising:

storing means for storing content consisting of a plurality of related media content parts adapted to be combined to express said content as a plurality of levels of selectable grades and wherein at least some of said parts have an associated restriction that inhibits that associated media content part from being combined to express said content and that stores a plurality of restriction removing data, each corresponding to one of said parts and that functions to permit that part to be combined, to thereby select which of said plurality of levels of grades is expressed;

first receiving means for receiving a first request of a client for transmission of the content;

first transmitting means for transmitting said content to said client upon said first request;

second receiving means for receiving a second request of said client for transmission of at least one of the restriction removing data; and second transmitting means for transmitting the restriction removing data to said client upon said second request;

wherein said second transmitting and receiving means effect the distribution of the restriction removing data and charging in accordance with difference of the grades.

3. A restriction removing method comprising the steps of:

(a) reading, from a memory, content consisting of a plurality of related media content parts adapted to be combined to express said content as a plurality of levels of selectable grades and wherein at least some of said media content parts have an associated restriction that inhibits that part from being combined to express said content, and that stores a plurality of restriction removing data, each corresponding to one of said parts and that functions to permit that part to be combined, to thereby select which of said plurality of levels of grades is expressed;

(b) receiving a first request of a client for transmission of the content;

(c) electronically transmitting said content to said client upon said first request;

(d) electronically receiving a second request of said client for transmission of at least one of the restriction removing data;

(e) electronically transmitting the restriction removing data to said client upon said second request to effect distribution of the restriction removing data; and (f) electronically charging in accordance with difference of the grades.

4. A computer readable storage medium storing a program for removing restriction and content consisting of a plurality of related media content parts adapted to be combined to express said content as a plurality of levels of selectable grades and wherein at least some of said parts have an associated restriction that inhibits that associated part from being combined to express said content, and storing a plurality of restriction removing data, each corresponding to one of said parts and that functions to permit that part to be combined, to thereby select which of said plurality of levels of grades is expressed, comprising the instructions of:

(a) receiving a first request of a client for transmission of the content;

(b) transmitting said content to said client upon said first request;

(c) receiving a second request of said client for transmission of at least one of the restriction removing data;

(d) transmitting the restriction removing data to said client upon said second request to effect distribution of the restriction removing data; and (e) charging in accordance with difference of the grades.

* * * * *